United States Patent [19]

Hurner

[11] 4,421,078

[45] Dec. 20, 1983

[54] OIL CHANGING SYSTEM

[76] Inventor: Erwin E. Hurner, 413 Valley Ave., Moorhead, Minn. 56560

[21] Appl. No.: 218,918

[22] Filed: Dec. 22, 1980

Related U.S. Application Data

[63] Continuation-in-part of Ser. No. 192,077, Dec. 29, 1980, abandoned.

[51] Int. Cl.³ .............................................. F02M 1/00
[52] U.S. Cl. ........................... 123/196 R; 123/196 S; 123/515; 123/1 A
[58] Field of Search ........... 123/510, 514, 515, 196 R, 123/196 S, 73 AD, 1 A; 184/6.5, 53

[56] References Cited

U.S. PATENT DOCUMENTS

| | | | |
|---|---|---|---|
| 1,352,123 | 9/1920 | Green | 123/515 |
| 2,539,604 | 1/1951 | Woolley | 123/196 S |
| 2,792,912 | 5/1957 | Kangas | 123/196 S |
| 3,114,356 | 12/1963 | Werner et al. | 123/73 AD |
| 3,137,285 | 6/1964 | Ausserbauer | 123/73 AD |
| 3,447,636 | 6/1969 | Bonfilio | 123/196 R |
| 3,561,565 | 2/1971 | Woor | 123/196 R |
| 3,638,031 | 1/1972 | Honda et al. | 123/196 R |
| 4,059,086 | 11/1977 | Tsubouchi | 123/73 AD |

FOREIGN PATENT DOCUMENTS

| | | | |
|---|---|---|---|
| 678269 | 7/1939 | Fed. Rep. of Germany | 123/73 AD |
| 1148109 | 5/1963 | Fed. Rep. of Germany | 123/73 AD |
| 503450 | of 1956 | Italy | 123/73 AD |
| 720222 | 12/1954 | United Kingdom | |
| 1454184 | 10/1976 | United Kingdom | |

Primary Examiner—Charles J. Myhre
Assistant Examiner—E. Rollins Cross
Attorney, Agent, or Firm—Bailey & Hardaway

[57] ABSTRACT

The invention is designed for use with a diesel engine in over-the-road trucks and periodically extracts a given quantity of oil from the oil pan of the engine and injects that quantity into the fuel tank for burning along with the regular fuel. In turn, an automatic oil level sensing device keeps the proper level of oil in the pan thus ensuring a constant infusion of fresh oil into the engine's oil supply as well as a periodic purging of old oil.

11 Claims, 1 Drawing Figure

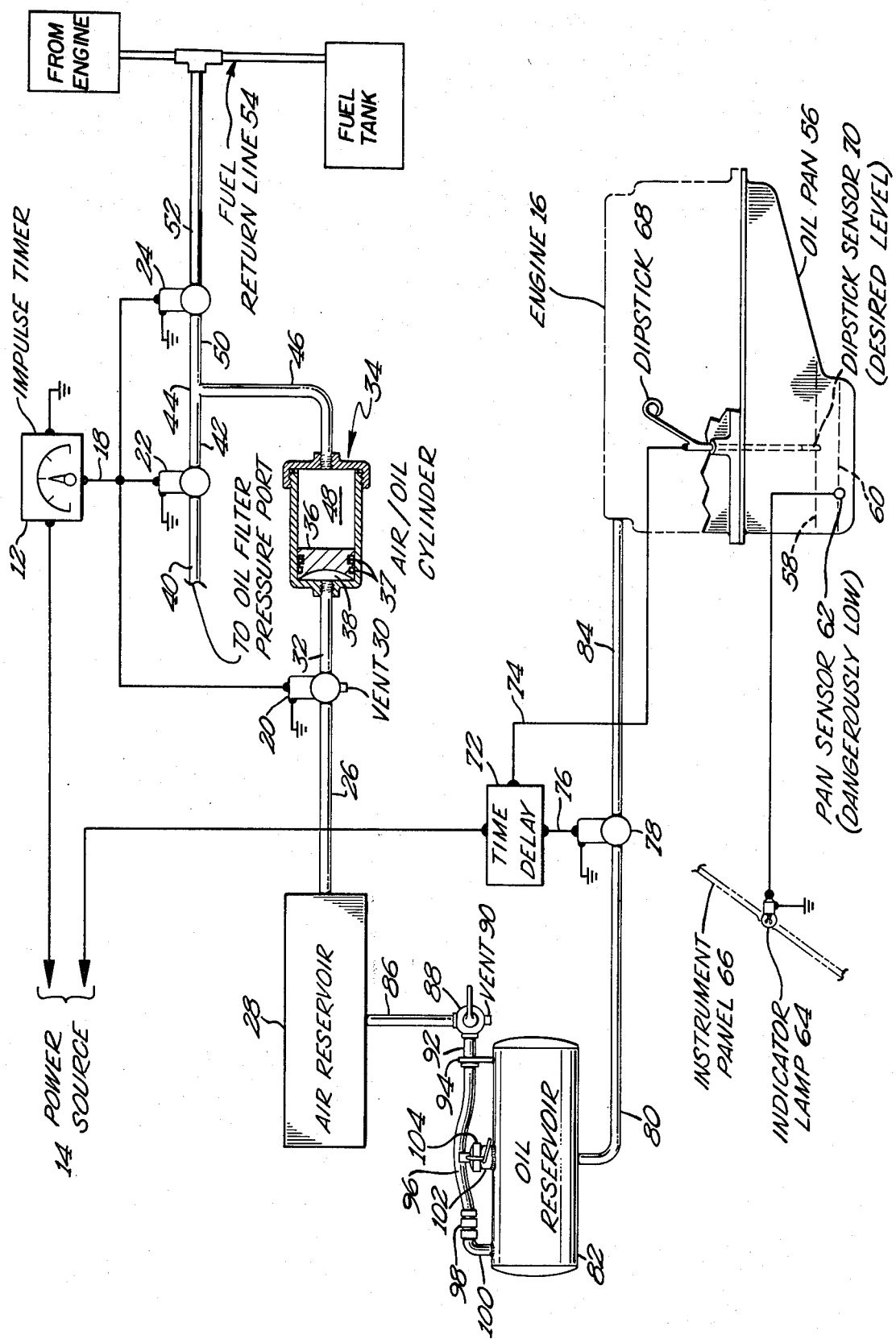

OIL CHANGING SYSTEM

RELATED APPLICATIONS

This application is a continuation-in-part of my application, Ser. No. 192,077, filed Sept. 29, 1980 now abandoned. The disclosure therein is hereby incorporated by reference.

BACKGROUND OF THE INVENTION

In the field of over-the-road trucking, it is highly desirable to be able to minimize the amount of service required on a vehicle in order that that vehicle be available for use on the road. The changing of oil and corresponding filter accounts for a substantial portion of the maintenance which will be performed on an over-the-road truck during its lifetime. Further, the service life of a diesel engine is directly related to the cleanliness of the oil run in the engine.

Thus, it is an object of this invention to provide a device which will substantially reduce the amount of maintenance time required in changing the oil on an over-the-road truck as well as any diesel powered vehicle and which will provide for the oil to remain substantially clean and effective.

SUMMARY OF THE INVENTION

In accordance with this invention an oil changing system is provided whereby predetermined amounts of lubricating oil are removed from an engine lubrication system at periodic intervals. The periodic intervals are established such that the entire contents of the lubrication system are removed during a mileage interval corresponding to a normal oil change interval. The lubricating oil removed from the lubricating system is deposited with diesel fuel and thus consumed by the combustion thereof in the diesel engine. The lubricating oil removed from the lubricating system is replaced so as to maintain a desired oil level by either conventional means or, preferably, by the means described and claimed in my copending application below referenced.

To this end, a small oil extractor pump is mounted to the oil output off the oil filter of a diesel engine. The output of the pump is directed to the fuel tank of the engine for burning along with the conventional diesel fuel. Operation of the pump is signalled by an impulse timer which is in turn connected to the ignition of the vehicle. The impulse timer is set so that the oil extractor pump is cycled periodically during vehicle operation to direct a predetermined amount of engine oil out of the oil pan and into the fuel tank.

In an embodiment described and claimed in my copending application, Ser. No. 401,533, filed July 26, 1982, an oil level sensor is provided in the oil pan of the engine to sense when the oil level has fallen below a predetermined point. The sensor is in turn connected to a solenoid valve which selectively allows oil from a reservoir to be directed into the oil pan and/or other portion of the oil system of the truck so as to maintain the oil level at the predetermined point. The oil reservoir is desirably pressurized by the air reservoir which is present on most over-the-road trucks as part of the braking system. Such pressurization allows the oil reservoir to be located at any height relative to the engine of the truck. The existing air reservoir also serves to actuate the oil extractor pump by way of a solenoid valve which is attached to the impulse timer mentioned above.

Provision is also made for pressurizing and depressurizing the oil reservoir in such a manner as to prevent the spewing of oil and to retain the cap of the reservoir.

These and other objects and advantages of the invention will become readily apparent as the following description is read in conjunction with the accompanying drawing wherein like reference numerals are used to refer to the views.

BRIEF DESCRIPTION OF THE DRAWING

The single FIGURE of Drawing schematically illustrates the invention.

DETAILED DESCRIPTION

In accordance with this invention an oil changing system is provided whereby predetermined amounts of lubricating oil are removed from an engine lubrication system at periodic intervals. The periodic intervals are established such that the entire contents of lubricating oil within the lubrication system are removed from the lubrication system during a period of time corresponding to a normal oil change interval. The lubricating oil removed from the lubricating system is deposited with diesel fuel and thus consumed by the combustion thereof in the diesel engine. The lubricating oil removed from the lubricating system is replaced so as to maintain a desired oil level by either conventional means or preferably by the means described and claimed in my above referenced copending application. Further description will be given with reference to the FIGURE of Drawing.

The oil changing system in accordance with this invention is schematically illustrated in the FIGURE of Drawing. An impulse timer 12 is connected to a power source 14. The power source 14 is the equivalent of the ignition system in a key-operated vehicle and thus source 14 and similarly impulse timer 12 are activated only when the engine 16 of the vehicle is running. Impulse timer 12 is set to produce a short (approximately seven seconds) impulse of power periodically through lead 18 to solenoid valves 20, 22 and 24. The input side of first solenoid valve 20 is connected by line 26 to an air reservoir 28. The output of first solenoid valve 20 is connected via line 32 to air/oil cylinder 34. Valve 20 is a three-way valve and in the non-energized position connects output line 32 to vent 30 and thus vents the air side 38 of cylinder 34 and allows piston 36 and cylinder 34 to assume the position shown in the drawing. When solenoid valve 20 is energized, lines 26 and 32 are connected thereby pressurizing the air chambers 38 of cylinder 34 and forcing piston 36 towards the right of cylinder 34. Second solenoid valve 22 is normally open in its non-energized state and connects a source of engine pressurized oil 40 to the input of solenoid valve 22. This source of pressurized oil 40 may be the output from the oil filter on the engine. The output 42 of solenoid valve 22 is connected to T-fitting 44 which is connected on one side via conduit 46 to the oil chamber 48 of air/oil cylinder 34.

The third solenoid valve 24 is of the normally closed type and the input 50 of valve 24 is connected to the remaining branch of T-fitting 44. The output 52 of third valve 24 is connected to the fuel return line 54 or may be routed directly to the fuel tanks if so desired.

This concludes the description of the components in the oil removing portion of the apparatus in accordance with this invention. As a preferred feature, the oil within the lubrication system is replaced by the oil replenishing system described below. However, the means for maintaining a predetermined oil level may be a conventional oil addition port. The oil addition system described below is claimed in my copending application above referenced.

Engine 16 generally has an oil pan 56. Shown in phantom on oil pan 56 are the desired oil level 58 and the dangerously low level 60. The desired level 58 is that level at which it is desired to maintain the oil level in the engine. The dangerously low level 60 is that level at which, if reached, operation of the vehicle should immediately cease until the oil has been brought to a proper level. A sensor 62 is located in oil pan 56 at the dangerously low level 60. This sensor is then connected to an indicator lamp 64 on the instrument panel 66 which will serve to instruct the operator to immediately shut the engine down. The normal dipstick in the engine is replaced by a dipstick sensor 68, wherein the dipstick is formed of a spiral wound material with a hollow core leaving room for a wire to run downward to the sensor 70 located at the bottom thereof. This use of the dipstick as an oil sensor allows very precise location of the desired level 58 in the engine. Such location which is formed by comparing dipstick 68 to the regular dipstick removed from the engine while giving much more accurate level 58 as opposed to attempting to drill pan 56 for a sensor similar to sensor 62. Sensor 70 is connected to time delay unit 72 by means of leads 74. Time delay unit 72 activates sensor 70 approximately two minutes after engine 16 has been shut off. This allows time for oil in the engine to drain back to pan 56 thereby allowing a true reading of the level to be obtained. After this two-minute interval, sensor 70 is activated for approximately seven minutes thereby allowing sensor 70 to sense whether the level in the pan 56 has fallen below desired level 58. If the actual level is below the desired level 58, delay unit 72 activates by means of leads 76 solenoid valve 78. The intake line 80 of valve 78 is connected to an oil reservoir 82 containing pressurized oil therein. The output line 84 of valve 78 leads to the valve cover or other portion of engine 16 wherein fresh oil may be added. Of course, when oil has come back up to desired level 58, sensor 70 will detect that condition and through the time delay unit 72 shut off solenoid valve 78. Sensor 70 is activated for approximately seven minutes in the desired embodiment after the two-minute delay so as to allow sufficient time for the oil level to be brought back to desired level 58 yet not have power running to sensor 70 at all times.

Briefly, oil reservoir 82 is pressurized by air reservoir 28. Line 86 leads from air reservoir 28 to air valve 88 which is a three-way type having a vent 90 and an output 92. Valve 88 is connected via output 92 to bracket 94 which is fixed to oil reservoir 82 as shown.

Oil reservoir 82 may be a generally cylindrical tank as shown and, due to the pressurization as will be more fully described hereinafter, may be located anywhere where there is space about the vehicle. The output line 92 of valve 88 is attached to a bracket 94 which is in turn attached to the top of reservoir 82. A flexible yet pressure resistant hose 96 connects line 92 to quick-disconnect fitting 98 of the type commonly used for air tools and the like which is in turn attached to elbow 100 which leads into reservoir 82. This air line upon opening of valve 88 serves to pressurize reservoir 82. Flexible hose 96 is fastened to the top of a filler cap 104 which is secured by a cam-loc fitting 102 of the type well known in the art. The length of hose 96 is such that lid 104 may not be removed from reservoir 82 without fitting 98 being disconnected. This serves to restrain lid 104.

OPERATION OF PREFERRED OIL LEVEL MAINTENANCE MEANS

When the vehicle is started, power source 14 is energized along with impulse timer 12. After a predetermined period of time, impulse timer 12 energizes solenoid valves 20, 22, and 24. At that time, valve 22 closes and valves 20 and 24 are opened thereby allowing the air from air reservoir 28 to pass through lines 26 and 32 and into air chamber 38 of cylinder 34. Thence, piston 36 is pressed to the right of the FIGURE thereby forcing the oil in oil chamber 48 through passage 46, junction 44, line 50 and 52 to the fuel return line 54. After approximately seven seconds of being energized, impulse timer 12 shuts off thereby opening valve 22, closing valve 24 and causing valve 20 to move to the vent position whereby the pressurized oil from the system forces piston 36 to the position shown in the FIGURE and air in air chamber 38 in line 38 is vented through vent 30 to the atmosphere. Thus, this portion of the system is ready for the next cycle.

Everytime the engine is turned off, after a delay of approximately two minutes in which time the oil has a chance to drain back into oil pan 56, time delay unit 74 activates dip stick sensor 70. If sensor 70 senses the presence of oil at the desired level 58, nothing further happens. Should sensor 70 not detect oil, delay unit 72 activates and opens solenoid valve 78, thereby allowing oil to flow from oil reservoir 82 through lines 80 and 84 and into engine 16. This continues until sensor 70 detects the presence of oil at which time solenoid valve 78 is shut off.

Air reservoir 28 is the conventional reservoir present on most over-the-road trucks for pressurization of brakes and the like. When it is desired to fill oil reservoir 82, valve 88 is turned to the vent position wherein the air pressurizing reservoir 82 is vented through vent 90 to the atmosphere. Then, quick-disconnect fitting 98 is uncoupled and cam-loc fitting 102 unlatched allowing removal of lid 104 for refilling of reservoir 82. It is to be noted that fitting 98 must be disconnected before lid 104 may be removed from the reservoir for filling by insuring that lid 104 will not be blown off reservoir 82 if reservoir 82 is pressurized.

OPERATION OF OIL REMOVAL MEANS

In the preferred embodiment, impulse timer 12 is set to activate air/oil cylinder 34 once for every eight minutes of engine operation, that is, for every eight minutes that power source 14 is activated. For each cycle of cylinder 34, approximately 0.8 ounces of oil is extracted from the oil pan and delivered to the fuel tank. If the truck averages 35 miles per hour of operation, this system will result in an effective complete change of oil every 9,000 miles with a truck having a 10-gallon oil capacity. The use of such a system allows the operator to control precisely the amount of impurities and solids suspended in the oil merely by changing the interval on which the impulse timer 12 operates.

By continually injecting new oil into the engine lubrication system, the additive package present in oils is maintained at a desirably high level and at an average level higher than that which will result from the normal change-type cycle. Further, by burning used oil along with the conventional diesel fuel, the full heat value of the used oil is extracted. In summary, the instant invention allows near maintenance-free operation of the oil system of the truck with only a very occasional check on the reservoir to make sure that it is up to the desired level.

While the preferred embodiments of the present invention have been described, it should be understood that various changes, adaptations and modifications may be made therein without departing from the spirit of the invention and the scope of the appended claims.

What is claimed is:

1. An oil changing system for automatically metering control amounts of engine lubricating oil into the diesel fuel supply of diesel engines as the engine operates, comprising:

a fuel tank remote from the engine containing diesel fuel oil;

an engine lubrication system containing a predetermined quantity of a lubricating oil different from said diesel fuel oil and including an oil pan;

control means for generating a regular, periodic signal at preset time intervals during engine operation, said time intervals corresponding to a predetermined oil change interval to provide for desired oil removal from said engine lubrication system;

fixed displacement pump means communicating with said engine lubrication system and with said fuel tank, said pump means being intermittently operable in response to said signal during engine operation for a controlled, limited duration in response to each periodic signal generated to withdraw a limited, predetermined amount of said lubricating oil from said engine lubrication system and to transport said limited amount into said fuel tank for thorough mixing of lubricating oil and fuel oil for subsequent combustion of the resultant mixture in the engine as fuel, said predetermined amount of lubricating oil withdrawn by said pump means at each signal interval and such predetermined intervals being such that said predetermined quantity of lubricating oil is withdrawn from said engine lubrication system over a predetermined lubricating oil drain time period; and means for maintaining a predetermined oil level in said oil pan;

whereby lubricating oil removed by said pump means is replaced and the lubricating oil in said lubrication systems maintains a substantially constant acceptable contaminant level and the need for discrete periodic oil changes is eliminated.

2. The oil changing system of claim 1 wherein said means for maintaining comprises means for sensing whether the oil in said pan is at said predetermined level.

3. The oil changing system of claim 2 wherein said sensing means is mounted on the dipstick of the engine.

4. The oil changing system of claim 2 wherein said means for maintaining further comprises time delay means connected to said sensing means so that oil will be added to said oil pan only when said oil level has fallen below said predetermined level for a predetermined period of time.

5. The oil changing system of claim 4, said level maintaining means further comprising an oil reservoir responsive to said sensing means.

6. The oil changing system of claim 5 wherein said oil reservoir is pressurized.

7. The oil changing system of claim 6, said system further comprising a valve, said valve comprising:

an inlet connectable to a source of pressurized air;

an outlet connected to said oil reservoir;

a vent to the atmosphere;

an open position connecting said inlet and said outlet; and a closed position connecting said outlet and said vent.

8. The oil changing system of claim 7, said system further comprising:

conduit means connecting said valve outlet and said oil reservoir;

filling means on said oil reservoir; and detachable fitting means connecting said conduit means and said oil reservoir, said conduit means being attached to said filling means and of such a length as to prevent removal of said filling means without detaching said fitting means.

9. The oil changing system of claim 1 wherein said control means comprises an impulse timer energized by the vehicle ignition circuit.

10. An oil changing system for automatically metering discrete amounts of engine lubricating oil into the diesel fuel supply for a diesel engine, comprising:

a fuel tank remote from a diesel engine for containing diesel fuel oil;

an engine lubrication system containing a predetermined quantity of lubricating oil, said lubricating oil being different from said diesel fuel oil and including an oil pan;

control means for generating a regular periodic signal at preset time intervals during engine operation, said time intervals corresponding to a predetermined oil change interval to provide for desired oil removal from said engine lubrication system;

fixed displacement pump means communicating with said engine lubrication system and with said fuel tank, said fixed displacement pump means being intermittently operable in response to said signal during engine operation for a controlled, limited duration in response to each periodic signal generated to withdraw a limited, predetermined amount of said lubricating oil from said engine lubrication system and to direct said limited predetermined amount of said lubricating oil into said fuel tank for mixing of said lubricating oil and said fuel oil for subsequent combustion thereof in the engine as a fuel, said predetermined amount of lubricating oil withdrawn by said pump means at each signal interval and such predetermined intervals being such that said predetermined quantity of lubricating oil is withdrawn from said engine lubrication system over a predetermined lubricating oil drain period;

whereby upon replenishment of lubricating oil with fresh lubricating oil a constant, acceptable contaminant level is established and maintained in said lubricating oil and the need for periodic discrete oil changes is eliminated.

11. The oil changing system of claim 10 wherein said engine has an oil filter having an output of clean filtered oil, said predetermined amount being withdrawn from said filter output.

* * * * *